June 26, 1923.
J. A. VOIROL
TIRE TOOL
Filed Aug. 14, 1920
1,459,867
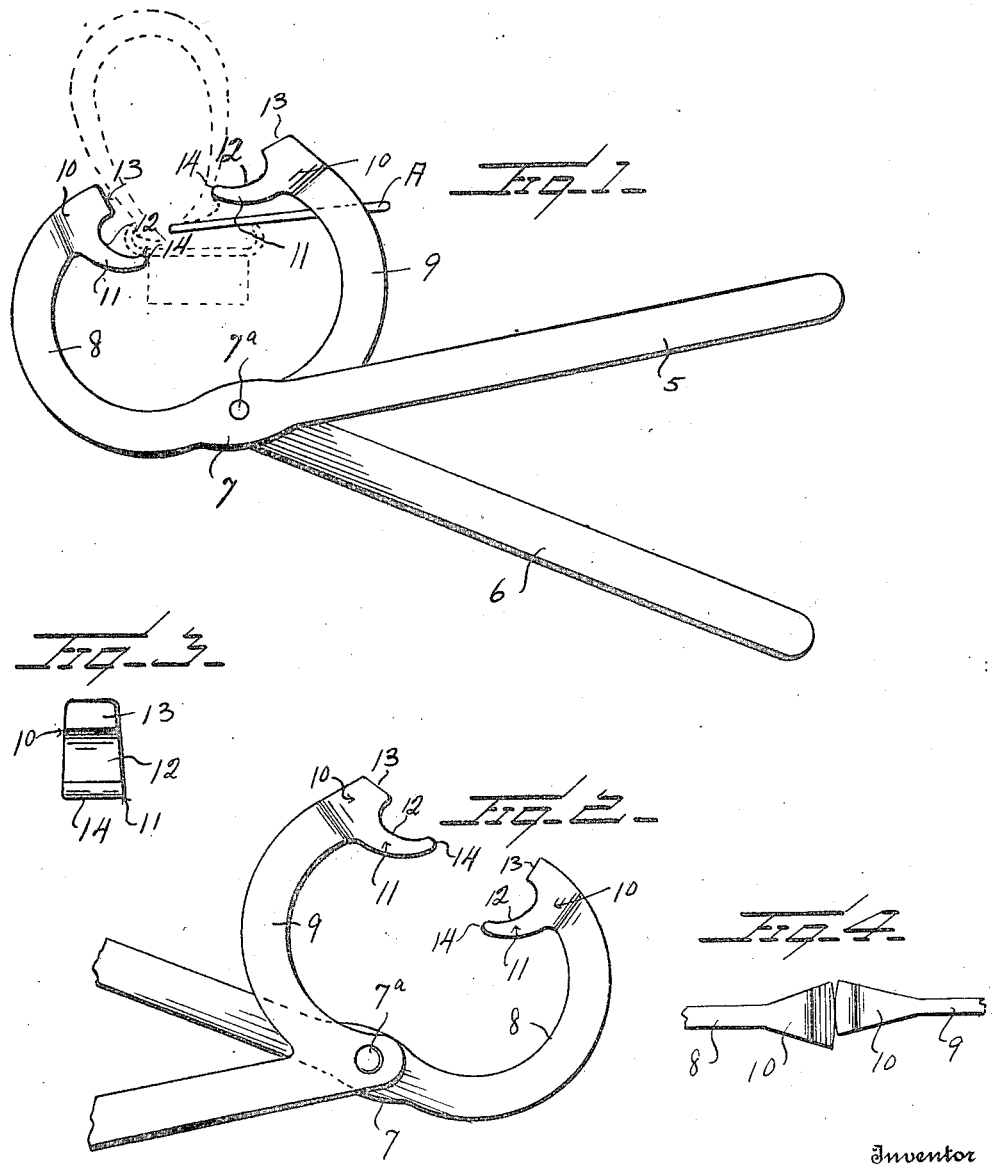
Inventor
J. A. Voirol
By Watson E. Coleman
Attorney Patented June 26, 1923.

1,459,867

UNITED STATES PATENT OFFICE.

JULES A. VOIROL, OF HARTFORD, CONNECTICUT.

TIRE TOOL.

Application filed August 14, 1920. Serial No. 403,476.

*To all whom it may concern:*

Be it known that JULES A. VOIROL, a citizen of the United States, residing at Hartford, in the county of Hartford and State of Connecticut, has invented certain new and useful Improvements in Tire Tools, of which the following is a specification, reference being had to the accompanying drawings.

This invention relates to tire tools and has for its object to provide a tool of this character capable of easily and quickly removing pneumatic tires from all types of wheel rims, and also replacing the tire.

Another object is to provide a tool of this character capable of being used on tires of various sizes regardless of the position of the wheel with respect to the mud guard.

A still further object of the invention is to provide a tool of this character arranged to extend over the felly of the wheel for engagement with the tire.

A still further object is to provide a tool of this character having a pair of curved jaws, the extremity of each jaw being enlarged and bifurcated to provide two projecting portions, one of said portions being broad and the other relatively narrow, said narrow portion extending inwardly of the jaw and beyond the broad portion.

With the above and other objects in view, the invention consists in the improved construction and arrangement of parts to be hereinafter more particularly described, fully claimed and illustrated in the accompanying drawings, in which:

Figure 1 is a side elevation of a tire tool constructed in accordance with an embodiment of the invention, and showing the tool in operation, the tire and rim being shown in dotted lines, Figure 2 is a side elevation taken from the opposite side to that shown in Figure 1, Figure 3 is a plan view of the tire engaging portions of the tool, and Figure 4 is a fragmentary plan view of the tire engaging portions of each jaw.

Referring to the drawings, my improved tire tool comprises handles 5 and 6, the end portion of the handle 5 being slightly enlarged and provided with a pivot opening 7, the remaining portion being curved to one side of the handle to provide a jaw 8. The end portion of the handle 6 is extended back upon said handle and curved to provide a jaw 9. The enlarged portion of the handle 5 is pivoted at the junction of the jaw 8 with the handle 6, by means of the pivot pin 7ª. Both jaws extend to one side of their respective handles and toward each other.

The extremity of each of the jaws 8 and 9 gradually extends upwardly from all sides of said jaw to provide a tire engaging member 10. One side portion of said enlarged member extends inwardly of the jaw and outwardly beyond the end portion of the opposite side of the member 10. The end surface 11 is provided with a recess 12, which divides the member 10 into two tire engaging portions 13 and 14, the surface of the portions 13 being relatively broad while the surface of the portion 14 is relatively narrow. The enlarged member 10 carried by the jaw 8 is larger than the member 10 carried by the jaw 9 so as to dispose said members in alinement with each other and compensates for the offset caused by the pivotal connection of the handles to each other.

In use the jaw members 8 and 9 are extended over the felly of the wheel, the recess 12 in the extremity of the jaw member 8 being engaged with the rim of the wheel while the portion 14 of the jaw 9 is engaged with the side of the tire on the opposite side of the rim. When the levers are moved towards each other the portion 14 of the jaw 8 serves as a fulcrum and permits the portion 14 of the jaw 9 to move the side of the tire inwardly and permit the same to be disengaged from the rim whereupon a suitable implement such as the member A is disposed beneath the side of the tire that has been disengaged from the rim. The portion 14 of the jaw 9 is then engaged with the opposite side of the rim similar to the jaw 8, and the portion 14 of the jaw 8 engaged with the opposite side of the tire. In this instance, the portion 14 of the jaw 9 serves as a fulcrum so that the broad portion 13 of the jaw 8 may force the side of the tire inwardly and permit the implement A to be moved between the bead of the tire and rim of the wheel. It will be noted that the end portions 13 and 14 are blunt so that danger of said portions injuring the tire is eliminated. Furthermore, the jaws 8 and 9 are so curved that they may be disposed between the spokes of the wheel and over the felly without danger of engaging the same. This eliminates the necessity of disposing the jaw members over the tire which in many instances, in view of the various types and designs of automobiles, is impossible in view of the fact that the mud guards are disposed closely adjacent the wheels, thus rendering it impossible to dispose the tool between the mud guard and the tire, to surround the latter. The recess 12 of the enlarged portion is formed in accordance with the contour of the rim so as to permit the portions 13 and 14 to operate efficiently without interfering with each other or marring the rim in any manner. In addition to this the end portion of the jaw 8 is larger than the end portion of the jaw 9 so that when the jaws are moved toward each other the portions 14 of the jaw 9 is received between the portions 13 and 14 of the jaw 8.

Another important feature of this tire tool is that it may also be used for applying a tire to the rim of a wheel. In this operation, the tire is applied by the hands of the operator as far as possible. The portion 14 of the jaw 8 is then placed into engagement with one side portion of the rim. The portion 14 of the jaw 9 is applied to the portion of the bead of the tire nearest to the rim of the wheel, the tire being positioned in the recess 12 of the jaw 9. Upon movement of the handles 5 and 6 toward each other the tire will be readily passed over the rim and properly positioned on the wheel.

From the foregoing it will be readily seen that this invention provides a novel tire tool which greatly reduces the time necessary to remove and apply a tire not only from solid rims but from sectional or demountable rims as there are no bolts or like fastening means to be operated as is necessary with the use of demountable rims and no pounding on the tire or the use of various implements as is necessary with solid rims. The novel construction of this device permits it to be used in connection with all forms of rims and wheels, and the diameter of the tire does not interfere with the use of the tool in the removing and applying operation.

What is claimed is:—

1. A tire tool comprising a pair of handles, each handle having one of its end portions extended to one side of said handle to provide a jaw, an extension extending from the inner longitudinal edge of each jaw, each of said extensions being disposed substantially at right angles to the jaw thereof and inwardly of the end face of the jaw, the end face of each jaw adjacent said extensions being arranged to alternately engage the side wall of a tire, said extensions being arranged to alternately engage a tire rim and the side wall of the tire remote from the wall engaged by the end face of the opposite jaw, the extension engaged with the tire rim serving as a fulcrum for the tool.

2. A tire tool comprising a pair of handles, means for pivotally connecting said handles for relative swinging movement, said handles outwardly of their pivotal connection being each extended from one side of the handle to provide a jaw, an extension projecting from the inner longitudinal edge of each jaw inwardly of the outer end of the jaw, one of said extensions being disposed outwardly of the extension of the second jaw when the jaws are in working position, the extension of one of the jaws being adapted to engage the tire holding rim, the extension of the second jaw being arranged to engage the tire at a point adjacent a bead of the tire, the outer ends of the jaws being blunt to provide substantially flat faces, the flat face of the jaw having the extension engaging with the rim adapted to have contact with the adjacent side of the tire to hold said side against flexing during a working operation.

In testimony whereof I hereunto affix my signature.

JULES A. VOIROL.